(12) United States Patent
Pittman et al.

(10) Patent No.: US 10,884,189 B2
(45) Date of Patent: Jan. 5, 2021

(54) NANOFIBER-SEGMENT RING RESONATOR

(71) Applicant: Todd Pittman, Ellicott City, MD (US)

(72) Inventors: Todd Pittman, Ellicott City, MD (US); Daniel Jones, Baltimore, MD (US); Garrett Hickman, Halethorpe, MD (US); James Franson, Ellicott City, MD (US)

(73) Assignee: UNIVERSITY OF MARYLAND, BALTIMORE COUNTY, Baltimore, MD (US)

(*) Notice: Subject to any disclaimer, the term of this patent is extended or adjusted under 35 U.S.C. 154(b) by 0 days.

(21) Appl. No.: 16/000,938

(22) Filed: Jun. 6, 2018

(65) Prior Publication Data

US 2018/0356595 A1   Dec. 13, 2018

Related U.S. Application Data

(60) Provisional application No. 62/515,616, filed on Jun. 6, 2017.

(51) Int. Cl.
| | |
|---|---|
| *G02B 6/293* | (2006.01) |
| *G01N 21/77* | (2006.01) |
| *G01N 21/00* | (2006.01) |
| *G02F 1/01* | (2006.01) |
| *G02B 6/10* | (2006.01) |
| *G02B 6/02* | (2006.01) |

(52) U.S. Cl.
CPC .......... *G02B 6/2934* (2013.01); *G01N 21/00* (2013.01); *G01N 21/7746* (2013.01); *G02B 6/107* (2013.01); *G02F 1/0118* (2013.01); *G02B 6/02028* (2013.01)

(58) Field of Classification Search
CPC ... G02B 6/107; G02B 6/2934; G02B 6/02028
See application file for complete search history.

(56) References Cited

U.S. PATENT DOCUMENTS

| | | | |
|---|---|---|---|
| 6,781,696 B1* | 8/2004 | Rosenberger | G01N 21/552 356/437 |
| 7,236,664 B2* | 6/2007 | Martin | G02B 6/12007 385/129 |
| 7,336,859 B2* | 2/2008 | Sanders | B82Y 20/00 385/12 |
| 7,545,843 B2* | 6/2009 | Armani | G02B 6/12007 372/19 |
| 8,208,502 B2 | 6/2012 | Srinivasan et al. | |
| 8,385,696 B2 | 2/2013 | Hakuta et al. | |

(Continued)

OTHER PUBLICATIONS

Edwards, Perry S., et al.; "Label-Free Particle Sensing by Fiber Taper-Based Raman Spectroscopy," IEEE Photonics Technology Letters, 2014; pp. 2093-2096, vol. 26.

(Continued)

*Primary Examiner* — Thomas A Hollweg
*Assistant Examiner* — Mary A El-Shammaa
(74) *Attorney, Agent, or Firm* — Tristan A. Fuierer; Olive Law Group, PLLC

(57) ABSTRACT

A fiber ring resonator having a relatively long loop of standard single-mode fiber with a short nanofiber segment. The evanescent mode of the nanofiber segment allows the cavity-enhanced field to interact with atoms in close proximity to the nanofiber surface.

18 Claims, 3 Drawing Sheets

(56) References Cited

U.S. PATENT DOCUMENTS

| | | | |
|---|---|---|---|
| 8,837,544 B2* | 9/2014 | Santori | B82Y 10/00 372/42 |
| 9,971,228 B2 | 5/2018 | Mazur et al. | |
| 2006/0215949 A1* | 9/2006 | Lipson | G02F 1/025 385/2 |
| 2007/0147732 A1* | 6/2007 | Sanders | B82Y 20/00 385/32 |
| 2010/0135612 A1 | 6/2010 | Waks et al. | |
| 2014/0355998 A1 | 12/2014 | Tanzilli et al. | |
| 2015/0276481 A1* | 10/2015 | Liu | G01J 3/44 356/301 |
| 2016/0327743 A1* | 11/2016 | Kippenberg | G02B 6/132 |
| 2018/0306696 A1* | 10/2018 | Ozdemir | G01N 15/1434 |

OTHER PUBLICATIONS

H. J. Kimble; "The quantum internet," Nature, 453, 1023 (2008).

S. M. Spillane, T. J. Kippenberg, O. J. Painter, and K. J. Vahala; "Ideality in a Fiber-Taper-Coupled Microresonator System for Application to Cavity Quantum Electrodynamics," Phys. Rev. Lett., 91, 043902 (2003).

T. Aoki, B. Dayan, E. Wilcut, W. P. Bowen, A. S. Parkins, T. J. Kippenberg, K. J. Vahala, and H. J. Kimble; "Observation of strong coupling bewtween one atom and a monolithic microresonator," Nature, 443, 671 (2006).

T. G. Tiecke, J. D. Thompson, N. P. de Leon, L. R. Liu, V. Vuletic, and M. D. Lukin,"nanophotonic quantum phase switch with a single atom," Nature, 508, 241 (2014).

A. Muller, E. B. Flagg, J. R. Lawall, and G. S. Solomon; "Ultrahighfinesse, low-mode-volume Fabry-Perot microcavity," Opt. Lett., 35, 2293 (2010).

D. Hunger, T. Steinmetz, Y. Colombe, C. Deutsch, T. W. Hansch, and J. Reichel; "A fiber Fabry-Perot cavity with high finesse," New J. Phys., 12, 065038 (2010).

C. Wuttke, M. Becker, S. Brückner, M. Rothhardt, and A. Rauschenbeutel; "nanofiber Fabry-Perot microresonator for nonlinear optics and cavity quantum electrodynamics," Opt. Lett., 37, 1949 (2012).

S. Kato and T. Aoki; "Strong Coupling between a Trapped Single Atom and an All-Fiber Cavity," Phys. Rev. Lett., 115, 093603 (2015).

F. L. Kien, J. Q. Liang, K. Hakuta, and V. I. Balykin,"Field intensity distributions and polarization orientations in a vacuum-clad subwavelength-diameter optical fiber," Opt. Commun., 242, 445 (2004).

J. E. Heebner, V. Wong, A. Schweinsberg, R. W. Boyd, and D. J. Jackson, "Optical Transmission Characteristics of Fiber Ring Resonators," IEEE J. Quantum Electron., 40, 726 (2004).

J. E. Heebner and R. W. Boyd,"Enhanced all-optical switching by use of a nonlinear fiber ring resonator," Opt. Lett., 24, 847 (1999).

R.F. Cregan, B.J. Mangan, J.C. Knight, T.A. Birks, P.S.J. Russell, P.J. Roberts, and D.C. Allan, "Single-Mode Photonic Band Gap Guidance of Light in Air," Science, 285, 1537 (1999).

L. Tong, J. Lou, and E. Mazur, "Single-mode guiding properties of subwavelength-diameter silica and silicon wire waveguides," Opt. Express, 12, 1025 (2004).

R. Boyd, "Nonlinear Optics," ScienceDirect, (Academic, New York, 1992).

T.B. Pittman, D.E. Jones, and J.D. Franson, "Ultralow-power nonlinear optics using tapered optical fibers in metastable xenon," Phys. Rev. A, 88, 053804 (2013).

S. M. Spillane, G. S. Pati, K. Salit, M. Hall, P. Kumar, R. G. Beausoleil, and M. S. Shahriar, "Observation of Nonlinear Optical Interactions of Ultralow Levels of Light in a Tapered Optical Nanofiber Embedded in a Hot Rubidium Vapor," Phys. Rev. Lett., 100, 233602 (2008).

T. Nieddu, V. Gokhroo, and S. N. Chormaic, "Optical nanofibres and neutral atoms," J. Opt., 18, 053001 (2016).

M. Sumetsky, Y. Dulashko, J. M. Fini, and A. Hale, "Optical microfiber loop resonator," Appl. Phys. Lett., 86, 161108 (2005).

L. Xiao and T. A. Birks, "High Finesse microfiber knot resonators made from double-ended tapered fibers," Opt. Lett., 36, 1098 (2011).

B. Wang and E. Mies, "Review of fabrication techniques for fused fiber components for fiber lasers," Proc. SPIE, 7195, 71950A (2009).

J. M. Choi, R. K. Lee, and A. Yariv, "Control of critical coupling in a ring resonator-fiber configuration: application to wavelengthselective switching, modulation, amplification, and oscillation," Opt. Lett., 26, 1236 (2001).

E. Vetsch, D. Reitz, G. Sague, R. Schmidt, S. T. Dawkins, and A. Rauschenbeutel, "Optical Interface Created by Laser-Cooled Atoms Trapped in the Evanescent Field Surrounding an Optical Nanofiber," Phys. Rev. Lett., 104, 203603 (2010).

H. Ma, J. Zhang, L. Wnag, Y. Lu, D. Ying, and Z. Jin, "Resonant micro-optic gyro using a short and high-finesse fiber ring resonator," Opt. Lett., 40, 5862 (2015).

J. E. Hoffman, S. Ravets, J. A. Grover, P. Solano, P. R. Kordell, J. D. Wong-Campos, L. A. Orozco, and S. L. Rolston, "Ultrahigh transmission optical nanofibers," AIP Adv., 4, 067124 (2014).

D. E. Jones, J. D. Franson, and T. B. Pittman, "Saturation of atomic transitions using subwavelength diameter tapered optical fibers in rubidium vapor," J. Opt. Soc. Am. B, 31, 1997 (2014).

A. Yariv, "Universal relations for coupling of optical power between microresonators and dielectric waveguides," Electron. Lett., 36, 321 (2000).

M. M. Lai, J. D. Franson, and T. B. Pittman, "Transmission degradation and preservation for tapered optical fibers in rubidium vapor," Appl. Opt., 52, 2595 (2013).

Schneeweiss, Philipp, et al.; "Fiber ring resonator with nanofiber section for chiral cavity quantum electrodynamics and multimode strong coupling," Optics Letters, 42, 85-88 (2017).

Rosenfeld, Wenjamin; "A high finesse optical resonator for cavity QED experiments," Diplomarbeit in Physik, 2003, pp. 1-62.

Sarmire, Elsa; "Nonlinear optics in daily life," Optics Express, 2013, pp. 30532-30544, vol. 21.

Jones, D.E., et al.; "Nanofiber-segment ring resonator," Optics Letters, 2016, pp. 3683-3685, vol. 41.

* cited by examiner

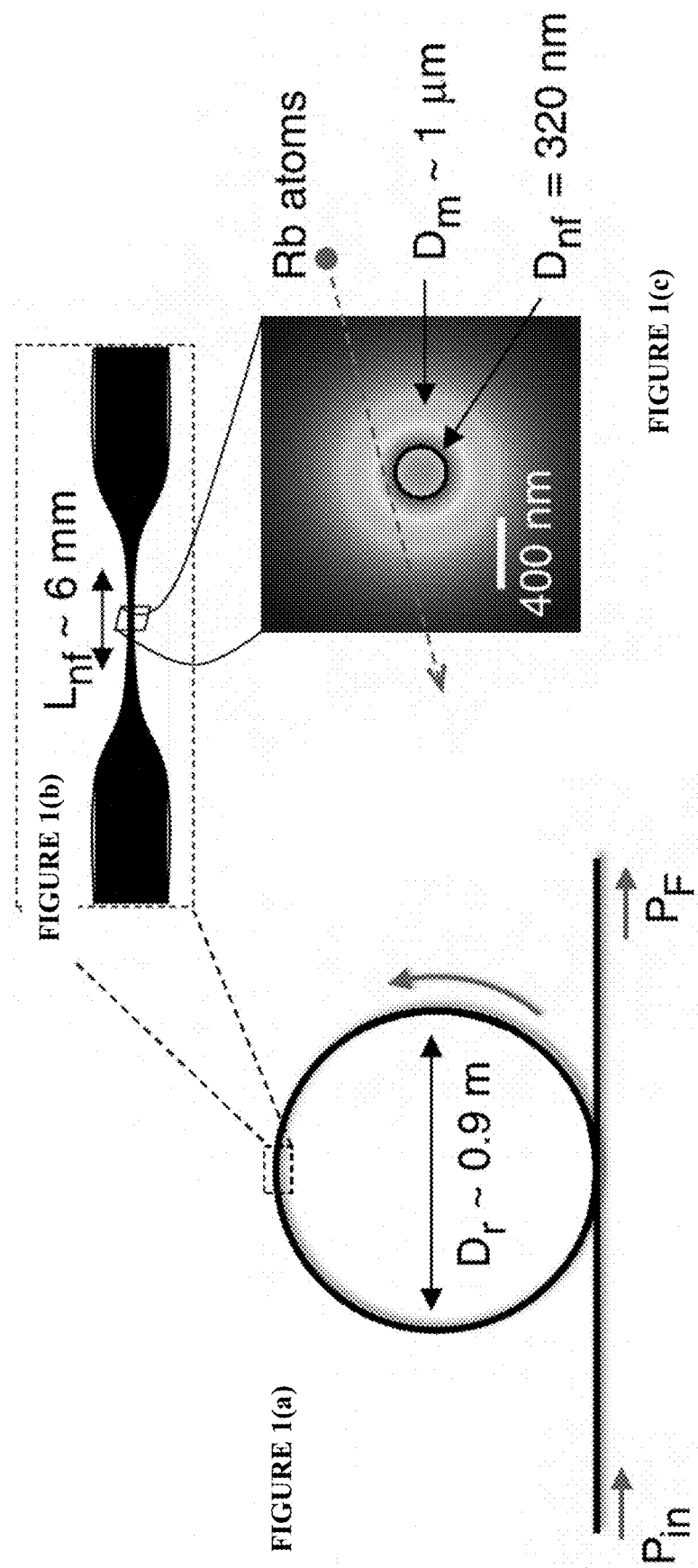

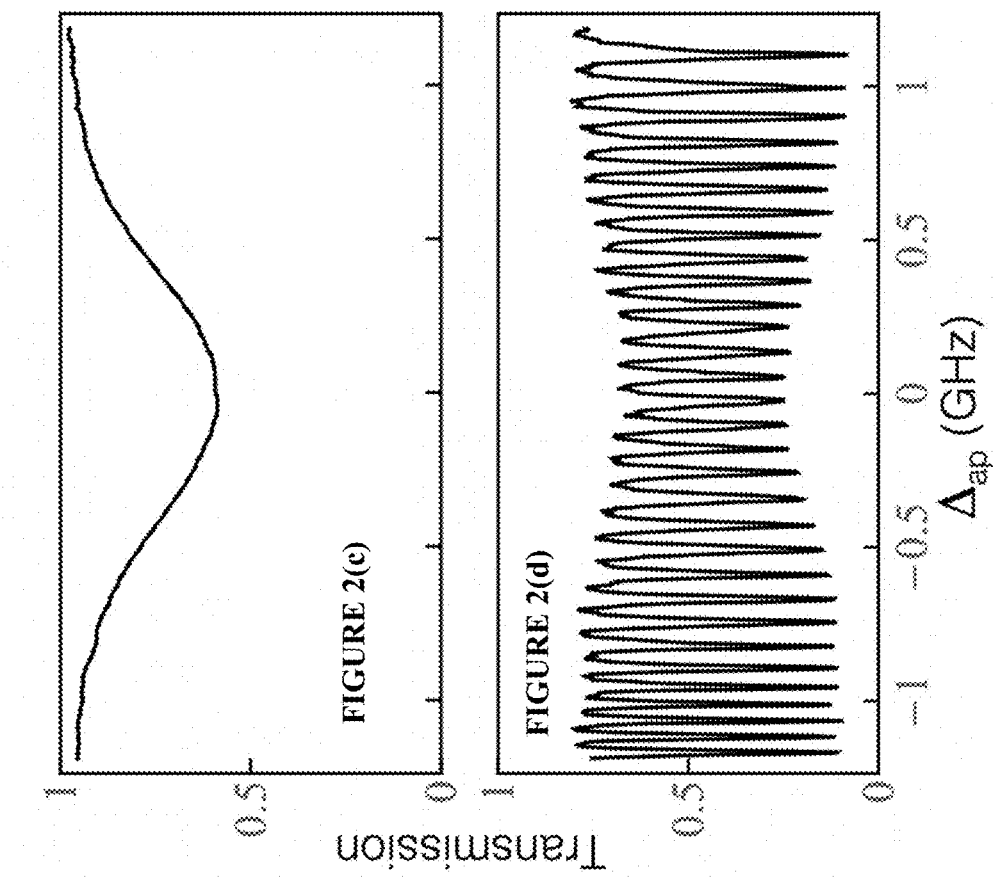
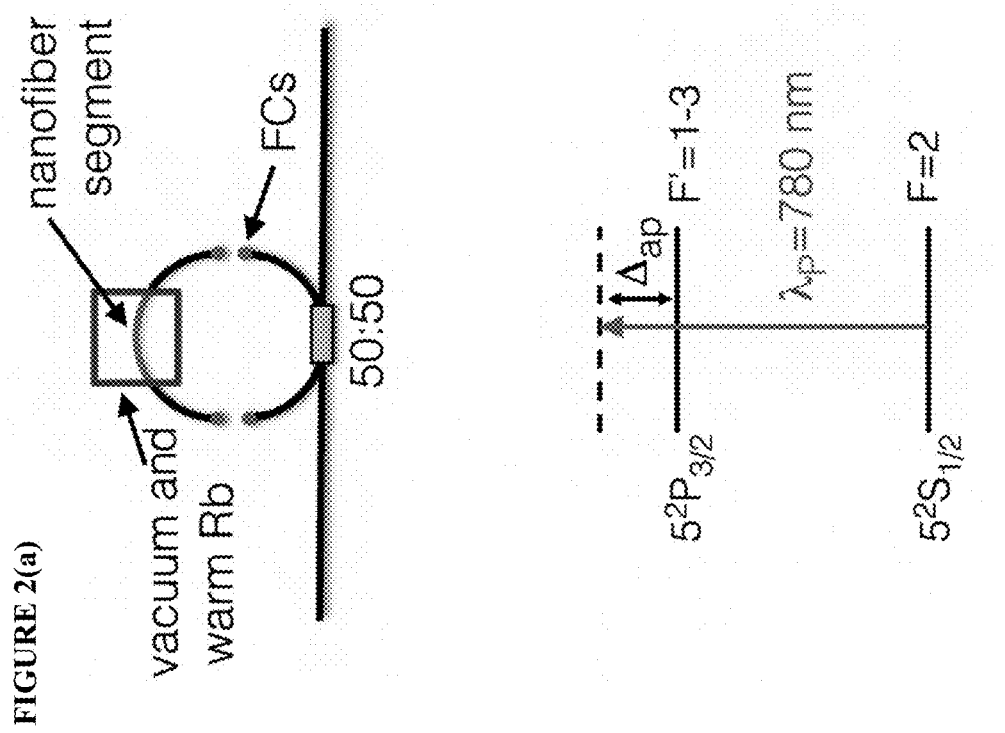

NANOFIBER-SEGMENT RING RESONATOR

CROSS REFERENCE TO RELATED APPLICATIONS

This application is filed under the provisions of 35 U.S.C. § 111(a) and claims priority to U.S. Provisional Patent Application No. 62/515,616 filed on Jun. 6, 2017 in the name of Todd B. Pittman et al. and entitled "Nanofiber-Segment Ring Resonator," which is hereby incorporated by reference herein in its entirety.

STATEMENT REGARDING FEDERALLY SPONSORED RESEARCH

Portions of this invention may have been financially supported by the United States Government support under a grant from the National Science Foundation under Grant Number 1402708 and a grant from the Office of Naval Research under Grant Number N00014-15-1-2229.

FIELD

The present invention relates to a fiber ring resonator comprising a loop of standard single-mode fiber with a short nanofiber segment. The evanescent mode of the nanofiber segment allows the cavity-enhanced field to interact with atoms in close proximity to the nanofiber surface. The fiber ring resonator described herein can be used in low-power nonlinear optics, all-optical switching, all-optical logic, molecular sensing, chemical sensing, atomic sensing and quantum computing.

BACKGROUND OF THE INVENTION

A compelling vision of the quantum internet involves atom-cavity nodes that are linked by flying photons propagating through fiber channels [1]. Within this context, there is a need for highly efficient coupling between the fiber mode and the cavity mode [2-4], or the development of "all-fiber" cavities in which this coupling is inherent [5,6]. The recent development of an all-fiber cavity formed by two fiber Bragg gratings (FBGs) enclosing the nanofiber waist of a tapered optical fiber (TOF) is a particularly exciting prospect [7]. In that system, the combination of the tight transverse confinement of the nanofiber's evanescent optical mode with the longitudinal confinement of the Fabry-Perot geometry can lead to very strong interactions with atoms in the cavity mode. In fact, this type of nanofiber-based Fabry-Perot cavity has recently been used to reach the strong coupling regime of cavity quantum electrodynamics (QED) [8].

SUMMARY OF THE INVENTION

In a first aspect, a nanofiber-segment ring resonator (NFSRR) is described, said NFSRR comprising a ring of fiber having an overall ring diameter and a core diameter, wherein the ring of fiber comprises at least one nanofiber segment, wherein the nanofiber segment has a nanofiber length and a nanofiber core diameter that is less than half a resonance wavelength of a quantum emitter.

Other aspects, features and embodiments of the invention will be more fully apparent from the ensuing disclosure and appended claims.

BRIEF DESCRIPTION OF THE FIGURES

FIG. 1(a) illustrates an overview of the NFSRR geometry.

FIG. 1(b) illustrates an exploded view of the tapered nanofiber segment of FIG. 1(a).

FIG. 1(c) is a color contour plot of the calculated nanofiber mode in the transverse plane [9].

FIG. 2(a) illustrates an embodiment including the fiber connectors (FCs), which allow a quick change between single-pass measurements through the nanofiber and measurements using the full NFSRR geometry.

FIG. 2(b) illustrates the relevant $^{85}$Rb energy level diagram.

FIG. 2(c) is the transmission spectrum for a single pass through the nanofiber.

FIG. 2(d) is the analogous transmission spectrum through the full NFSRR geometry.

DETAILED DESCRIPTION, AND PREFERRED EMBODIMENTS THEREOF

Figures 3A, 3B:
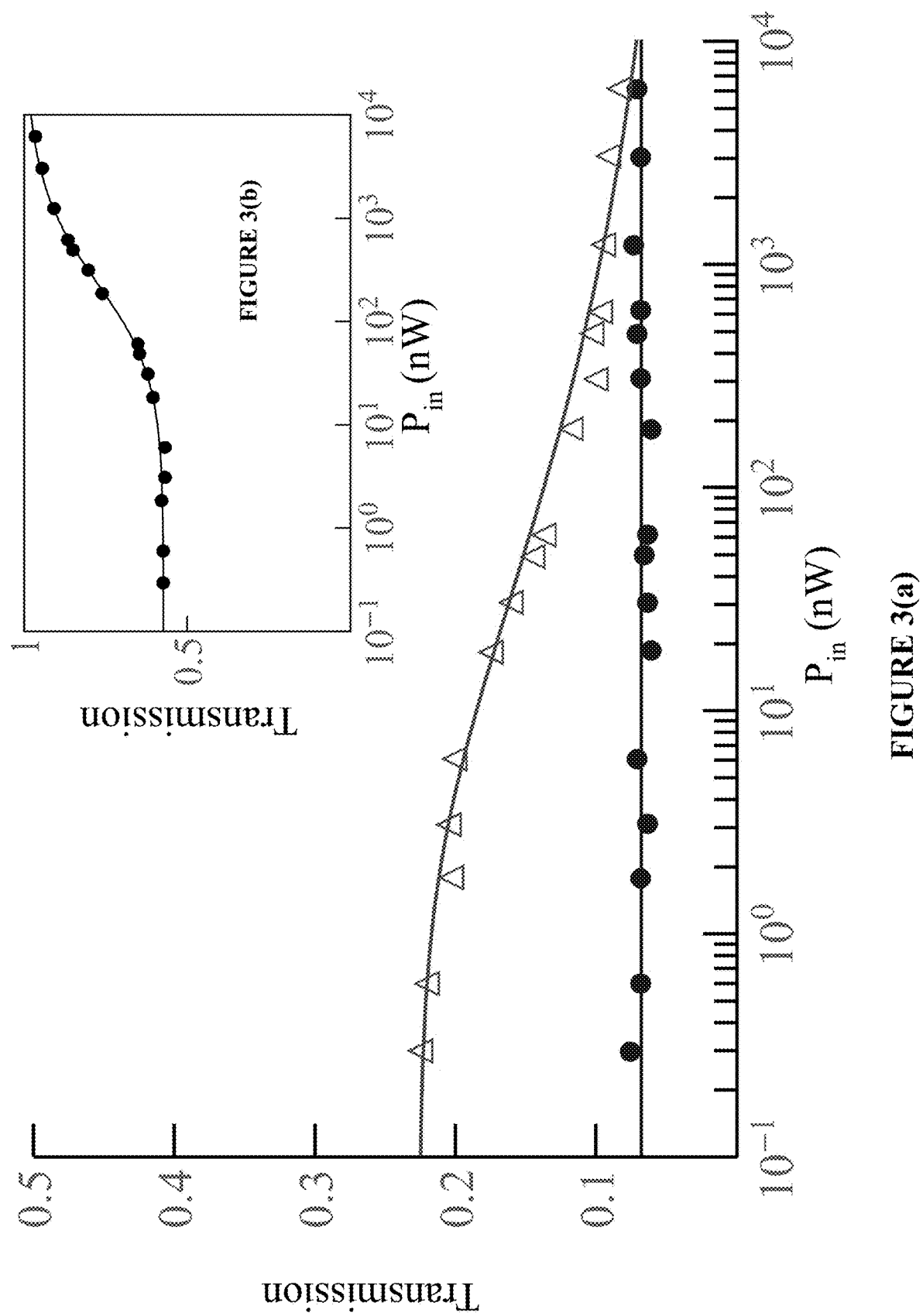
FIG. 3(a) illustrates the nonlinear response of the atom-cavity system. "With atoms," (hollow triangles) the cavity moves from being undercoupled (trans. ~23%) back to near-critically coupled (trans. ~8%) due to the saturation of Rb loss at higher input powers.
FIG. 3(b) illustrates the saturation of Rb loss in a single pass through the nanofiber segment.

A nanofiber-based cavity is described herein that uses the geometry of a conventional fiber-ring resonator [10] rather than a Fabry-Perot cavity. When atoms are present in the nanofiber evanescent mode, this can essentially be viewed as a nonlinear fiber ring resonator [11], wherein the bulk-material nonlinearity of the silica fiber has been replaced with a resonant atomic interaction. This nonlinearity is demonstrated by saturating the atomic response with cavity fields at ultralow input powers in a proof-of-concept experiment. Technical improvements that would be needed to use this nanofiber-based ring resonator geometry for cavity QED experiments are further discussed.

Subwavelength diameter tapered optical fibers (TOFs) enable low-loss propagation of evanescent and air-guided modes with very small mode areas over very long distances [12, 13]. The interaction of these highly confined fields with atomic vapors can allow the realization of optical nonlinearities at remarkably low power levels [14].

The instant inventors previously investigated the use of xenon in "single pass" TOF experiments, wherein the TOF suspended in a dc discharge tube containing a relatively low-density gas of metastable Xe atoms [15]. Saturated absorption at nanowatt-power levels was observed, which indicates the suitability of a TOF for further ultralow-power nonlinear optics applications. Towards that end, the inventors integrated a TOF device in a resonator geometry.

As defined herein, an "all-fiber" cavity corresponds to a device or system comprising at least one fiber arranged in a ring resonator structure, wherein the device or system is free of mirrors, microtoroids, or other structures formed using lithographic techniques known in the art of semiconductor materials. That said, it should be appreciated that the all fiber cavity could be positioned in close proximity with an alternative cavity device or system, for example, one containing a cavity comprising mirrors, microtoroids, or other structures formed using lithographic techniques known in the art of semiconductor materials. In one embodiment, the all-fiber cavity does not include integrated fiber Bragg gratings (RBG). The all-fiber cavity described herein uses the geometry of a conventional fiber-ring resonator rather than a Fabry-Perot geometry cavity.

Reference is made to the "ring resonator" and although it is suggested from the description and the figures that the ring is being perfectly or approximately circular, it should be appreciated that the "ring" can be any closed-loop shape including, but not limited to, a circle, an oval, a rectangle with rounded corners, a triangle with rounded corners, or a polygon. It should also be appreciated that the "ring" can be any of these shapes and could be symmetrical or unsymmetrical.

An overview of the nanofiber-based cavity of the invention is shown in FIG. 1. A small region at the top of a standard single-mode fiber ring resonator is tapered to provide a short sub-wavelength diameter nanofiber segment. The tapered nanofiber can be fabricated from a standard glass optical fiber that has been heated and stretched to a diameter at or below the wavelength of light of the incident laser, at which point the evanescent field extends into the surrounding air and allows the taper to function as a near-field optic. A schematic of a tapered nanofiber segment is shown in FIG. 1(a), and the exploded view in FIG. 1(b). It should be appreciated that the tapered nanofiber can be fabricated using other methods, as readily understood by the person skilled in the art. The evanscent mode (see, FIG. 1(c)) guided by this nanofiber segment interacts with surrounding quantum emitters [16, 17], and the cavity resonance is tuned to match the resonance of the quantum emitters by adjusting the overall diameter of the ring. Note that this geometry is fundamentally different than microfiber loop (MFL) resonators, in which the entire ring (including the coupling region) is comprised of micro- or nanofibers [18]. MFL-type resonators have the advantage of very small mode volumes (loop diameters), but typically suffer from low finesse due to difficulty in controlling the coupling region [19]. In contrast, the nanofiber-segment ring resonator (NFSRR) in FIG. 1 has a comparatively large mode volume (ring diameter), but the possibility of very high finesse by utilizing mature large-scale fiber coupler technologies [20].

The nanofiber-based cavity described herein has the advantage of efficiently coupling light to quantum emitters, such as atoms, molecules, ions, or quantum dots. Accordingly, the nanofiber-based cavity described herein can be used in systems and methods for molecular sensing (in gases or liquids), chemical sensing (in gases or liquids), and atomic sensing.

An atom-cavity system comprised of an NFSRR and warm Rb vapor is described in the examples. In a proof-of-concept experiment using a low-finesse resonator, a strong interaction was observed between the cavity field and the atoms resulting in nonlinear transmission at ultralow (nW) power levels. This ability to optically control the internal loss of a ring resonator system forms the basis for a number of low-power but slow (narrowband) switching and modulation technologies [11, 21]. The all-pass geometry utilized here can be easily changed into a drop-add configuration by adding at least one additional coupling fiber, and it is possible to have multiple nanofiber segments within the ring, e.g., one, two, three, four, five, or more nanofiber segments, as readily understood by the person skilled in the art.

The atom-cavity system having the NFSRR geometry can be used in a low power, non-linear optic system, an all-optical switching system, and an all-optical logic system, as well as a method of using each of these.

The NFSRR geometry can be used for cavity QED applications using the pioneering work of Kato and Aoki as a benchmark [8]. There, the strong coupling regime was reached using a trapped cesium atom in a nanofiber Fabry-Perot cavity with an overall length of 33 cm, FBG mirror reflectivity of 99.5%, and a finesse of $\mathcal{F} \sim 40$ [8]. The keys to the strong coupling were high-quality atom trapping near the nanofiber surface [22] and the remarkably small mode volume of the all-fiber cavity [7]. In the NFSRR geometry described here, comparable mode volumes and comparable finesse values can be achieved, given that conventional fiber ring resonators with finesse values of several hundreds have been realized [23] and ultrahigh transmission (99.95%) TOFs have been achieved [24]. Consequently, the NFSRR provides an alternative cavity QED platform by adopting atom trapping strategies that are compatible with a ring cavity geometry.

Accordingly, in another embodiment of the invention, ultrahigh transmission TOFs [24] can be used to realize high-finesse NFSRRs. These high-finesse devices may be useful within the context of "all-fiber" cavity QED systems [7, 8] as an enabling technology for the quantum internet [1].

The features and advantages of the invention are more fully illustrated by the following non-limiting examples, wherein all parts and percentages are by weight, unless otherwise expressly stated.

Example 1

In this initial experimental work, a warm vapor of rubidium atoms (T~85° C.) and a relatively large overall ring diameter of $D_r$~0.9 m were used, as shown in FIG. 1(a). This gives a short free spectral range (FSR~76 MHz) that provides several cavity resonances within the Doppler-broadened Rb linewidth (~750 MHz). The cavity response (both with and without the atoms) was measured by scanning a tunable narrowband diode laser (Newport Velocity TLB-6700) across several FSRs. The transmitted signals were measured using a standard photodiode or other equivalent detecting means. The primary fiber ring had a standard single-mode optical fiber with a core diameter of ~5 µm and a cladding diameter of 125 µm (Thorlabs SM-800-5.6-125). The nanofiber segment was produced using the heat and pull method and had a final diameter of roughly $D_{nf}$~320 nm and a length of $L_{nf}$~6 mm [25] (see, FIGS. 1(a) and 1(b)). For Rb resonant light at 780 nm, this $D_{nf}$ guides an evanescent mode with a mode field diameter of $D_m$~1 µm (see, FIG. 1(c)). Thermal Rb atoms fly through this mode field on a timescale of a few ns.

For the instant device, $D_{nf}$ is dictated by the resonance wavelength of the quantum emitter to be sensed/used in the experiments. The optimal $D_{nf}$ is slightly less than half of the resonance wavelength. For example, when the quantum emitter is rubidium, which has a resonance wavelength of 780 nm, the optimal $D_{nf}$ is about 320 nm. In principle, $L_{nf}$ is not constrained, and should generally be as long as possible to maximize the interaction zone in the specific vacuum chamber. The ring diameter $D_r$ can be large if one wants to achieve small mode spacing with a large cavity mode volume, or the $D_r$ can be small if one wants to achieve a large mode spacing with a smaller cavity mode volume. The $D_m$ is fixed by the $D_{nf}$. Although a single-mode silica optical fiber is disclosed, it should be appreciated that the fiber can be made using materials as readily understood by the person skilled in the art.

In a ring resonator geometry, critical coupling is achieved when the coupling loss into the ring is equal to the total internal loss [26]. For the NFSRR studied here, the intrinsic internal loss is roughly 50%. This is primarily due to an overall initial TOF transmission of 70% (a non-adiabatic taper) and a subsequent degradation due to Rb accumulation on the nanofiber surface [27]. As shown in FIG. 2(a), the TOF was inserted between two ports of a commercial fused fiber coupler with a 50:50 coupling ratio (Thorlabs FC780-50B-FC) to form a NFSRR that is reasonably close to being critically coupled, albeit with very low finesse. In a preferred embodiment, the coupling ratio of the fiber coupler is adjustable and is chosen to match the internal loss in the NFSRR. For example, in the experiment performed herein, there was a 50% internal loss in the ring and so a 50:50 coupler was used. If the ring has a 0.1% internal loss, the coupler used would be about 99.9/0.1. The fiber coupler allows the user to couple light into and out of the ring resonator. Fiber connectors (FCs) allow a quick change between single-pass measurements through the nanofiber and measurements using the full NFSRR geometry. The nanofiber segment is enclosed in a vacuum system filled with warm Rb vapor, with the coupler and the majority of the fiber ring outside of the vacuum system. Vacuum systems such as this are readily understood to the person skilled in the art.

The $5^2S_{1/2}(F=2) \rightarrow 5^2P_{3/2}(F'=1-3)$ $^{85}$Rb transition was utilized as shown in FIG. 2(b) and the transmission spectra as the probe frequency $\omega_p$ is scanned through the atomic resonance $\omega_a$ was recorded. For the transmission spectrum shown in FIG. 2(c), the TOF is temporarily disconnected from the ring cavity, allowing a single-pass measurement through the nanofiber segment. The Doppler- and transit time-broadened absorption profile in FIG. 2(c) shows the interaction of the nanofiber evanescent mode with the Rb atoms [16], and a single-pass optical depth in our system of OD~0.5 on Rb resonance ($\Delta_{ap}=0$).

Although rubidium was used in the experiment described herein, it should be appreciated that other reactive alkali-metal vapors can be used, e.g., cesium, as well as noble gases such as xenon. In addition, the NFSRR can be used with other quantum emitters, e.g., atoms, molecules, ions, or quantum dots, as readily understood by the person skilled in the art.

For the data shown in FIG. 2(d), the TOF is reconnected in the ring cavity geometry, and the measurement is repeated. The cavity shows an FSR=(76±12) MHz and a measured finesse of $\mathcal{F}$=3.6±0.4 away from the Rb resonance (near $\Delta_{ap}$~−1 GHz). At this detuning, the cavity is close to critical coupling (note that the transmission does not drop all the way to zero on the cavity resonance due to a slight mismatch between the coupling loss and the intrinsic internal loss, as well as small polarization errors due to uncompensated birefringence in the nanofiber segment). The main result is seen as the detuning is scanned through $\Delta_{ap}=0$, where the increasing absorption by the Rb atoms provides an additional internal cavity loss mechanism that moves the cavity farther from critical coupling into the strongly under-coupled regime [20].

FIG. 3(a) demonstrates the strong nonlinear response of this atom-cavity system. The main plot shows the transmission of the cavity resonance "with atoms" (hollow triangles; $\Delta_{ap}$~0) as a function of input power $P_{in}$. As $P_{in}$ is increased, the Rb excited state population begins to saturate [25], resulting in a reduction of atomic absorption loss and a return to near-critical coupling (trans. ~8%) when the absorption is fully saturated at higher powers. In contrast, the transmission of a cavity resonance "without atoms" (solid circles: $\Delta_{ap}$~−6 GHz) is linear with $P_{in}$.

For reference, FIG. 3(b) shows a single-pass transmission through the nanofiber segment (i.e., with the TOF temporarily disconnected from the ring cavity) over the same range of input powers. The onset of absorption saturation at remarkably low powers ($P_{in}$~10 nW) is fundamentally due to the small mode area guided by the nanofiber segment 1251 and is the origin of the nonlinearity in the main plot. With a finesse of only $\mathcal{F}$~3.6 in this proof-of-concept experiment, the cavity field buildup factor is on the order of unity, and the rapid change in the cavity transmission (hollow triangles) also begins around $P_{in}$~10 nW. Improvements to the finesse would result in larger cavity buildup factors, and the onset of nonlinear transmission at even lower input powers.

All curves in FIGS. 3(a)-(b) are fitted to the data using a simple nonlinear transmission model [25].

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

REFERENCES

[1] H. J. Kimble, *Nature.* 453, 1023 (2008).
[2] S. M. Spillane, T. J. Kippenberg. O. J. Painter, and K. J. Vahala, *Phys. Rev. Lett.,* 91, 043902 (2003).
[3] T. Aoki, B. Dayan, E. Wilcut, W. P. Bowen. A. S. Parkins. T. J. Kippenberg, K. J. Vahala, and H. J. Kimble, *Nature,* 443, 671 (2006).
[4] T. G. Tiecke, J. D. Thompson, N. P. de Leon, L. R. Liu. V. Vuletic, and M. D. Lukin. *Nature,* 508, 241 (2014).
[5] A. Muller, E. B. Flagg, J. R. Lawall, and G. S. Solomon, *Opt. Lett.,* 35, 2293 (2010).
[6] D. Hunger. T. Steinmetz, Y. Colombe. C. Deutsch, T. W. Hansch. and J. Reichel, *New J. Phys.,* 12, 065038 (2010).
[7] C. Wuttke, M. Becker. S. Brückner, M. Rothhardt, and A. Rauschenbeutel, *Opt. Lett.,* 37, 1949 (2012).
[8] S. Kato and T. Aoki, *Phys. Rev. Lett.,* 115, 093603 (2015).
[9] F. L. Kien, J. Q. Liang, K. Hakuta, and V. I. Balykin, *Opt. Commun.,* 242, 445 (2004).
[10] J. E. Heebner, J. Wong, A. Schweinsberg, R. W. Boyd, and D. J. Jackson, *IEEE J. Quantum Electron.,* 40, 726 (2004).
[11] J. E. Hccebner and R. W. Boyd, *Opt. Lett.,* 24, 847 (1999).
[12] R. F. Creegan, B. J. Mangan, J. C. Knight, T. A. Birks, P. S. J. Russell, P. J. Roberts, and D. C. Allan. *Science.* 285, 1537 (1999).
[13] L. Tong, J. Lou, and E. Mazur, *Opt. Express,* 12, 1025 (2004).
[14] R. Boyd, *Nonlinear Optics* (Academic. New York, 1992).
[15] T. B. Pittman, D. E. Jones, and J. D. Franson, *Phys. Rev. A,* 88, 053804 (2013).
[16] S. M. Spillane. G. S. Pati, K. Salit, M. Hall, P. Kumar, R. G. Beausoleil, and M. S. Shahriar, *Phys. Rev. Lett.,* 100, 233602 (2008).
[17] T. Nieddu, V. Gokhroo, and S. N. Chormaic, *J. Opt.,* 18, 053001 (2016).
[18] M. Sumetsky, Y. Dulashko, J. M. Fini, and A. Hale, *Appl. Phys. Lett.,* 86, 161108 (2005).
[19] L. Xiao and T. A. Birks, *Opt. Lett.,* 36, 1098 (2011).

[20] B. Wang and E. Mies, *Proc. SPIE*, 7195, 71950A (2009).
[21] J. M. Choi, R. K. Lee, and A. Yariv, *Opt. Lett.*, 26, 1236 (2001).
[22] E. Vetsch, D. Reitz, G. Sague, R. Schmidt, S. T. Dawkins, and A. Rauschenbeutel, *Phys. Rev. Lett.*, 104, 203603 (2010).
[23] H. Ma. J. Zhang, L. Wang, Y. Lu, D. Ying, and Z. Jin, *Opt. Lett.*, 40, 5862 (2015).
[24] J. E. Hoffman, S. Ravets, J. A. Grover, P. Solano, P. R. Kordell, J. D. Wong-Campos, L. A. Orozco, and S. L. Rolston, *AIP Adv.*, 4, 067124 (2014).
[25] D. E. Jones, J. D. Franson, and T. B. Pittman, *J. Opt. Soc. Am. B*, 31, 1997 (2014).
[26] A. Yariv, *Electron. Lett.*, 36, 321 (2000).
[27] M. M. Lai, J. D. Franson, and T. B. Pittman, *Appl. Opt.*, 52, 2595 (2013).

What is claimed is:

1. A nanofiber-segment ring resonator (NFSRR) comprising a ring of fiber having an overall ring diameter and a core diameter, wherein the ring of fiber comprises at least one nanofiber segment, wherein the nanofiber segment has (i) a nanofiber length and (ii) a nanofiber core diameter that is less than half a resonance wavelength of a quantum emitter.

2. The NFSRR of claim 1, wherein the nanofiber segment is tapered relative to the fiber.

3. The NFSRR of claim 1, wherein the NFSRR is an all-fiber cavity free of mirrors, microtoroids, or other structures formed using lithographic techniques known in the art of semiconductor materials.

4. The NFSRR of claim 1, wherein the NFSRR is positioned in proximity to a separate cavity device comprising mirrors, microtoroids, or other structures formed using lithographic techniques.

5. The NFSRR of claim 1, wherein the NFSRR has a symmetrical or unsymmetrical closed loop shape selected from the group consisting of a circle, an oval, a rectangle with rounded corners, a triangle with rounded corners, and a polygon.

6. The NFSRR of claim 1, wherein the at least one nanofiber segment is enclosed in a vacuum system.

7. The NFSRR of claim 6, wherein the vacuum system comprises quantum emitters comprising atoms, molecules, ions, quantum dots, and any combination thereof.

8. The NFSRR of claim 6, wherein the vacuum system comprises reactive alkali-metal vapors.

9. The NFSRR of claim 7, wherein cavity resonance is tuned to match the resonance of the quantum emitters by adjusting the overall ring diameter.

10. The NFSRR of claim 1, wherein a fiber coupler is used to couple light into and out of the NFSRR.

11. The NFSRR of claim 10, wherein a coupling ratio of the fiber coupler is adjustable and is chosen to match an internal loss in the NFSRR.

12. An atom-cavity system comprising the NFSRR of claim 1, wherein the ring of fiber defines a cavity, wherein interactions between a cavity-enhanced field and atoms in close proximity to the nanofiber segment results in nonlinear transmission.

13. The atom-cavity system of claim 12, wherein the nanofiber segment is enclosed in a vacuum system.

14. The atom-cavity system of claim 12, wherein the system is used in a low power, non-linear optic system, an all-optical switching system, or an all-optical logic system.

15. The atom-cavity system of claim 12, wherein the nonlinear transmission occurs at low power levels.

16. The atom-cavity system of claim 12, wherein a fiber coupler is used to couple light into and out of the NFSRR.

17. The atom-cavity system of claim 16, wherein a coupling ratio of the fiber coupler is adjustable and is chosen to match an internal loss in the NFSRR.

18. The NFSRR of claim 1, wherein when an evanescent field of the nanofiber segment interacts with quantum emitters, a nonlinear interaction occurs.

* * * * *

UNITED STATES PATENT AND TRADEMARK OFFICE
CERTIFICATE OF CORRECTION

| | |
|---|---|
| PATENT NO. | : 10,884,189 B2 |
| APPLICATION NO. | : 16/000938 |
| DATED | : January 5, 2021 |
| INVENTOR(S) | : Todd Pittman et al. |

Page 1 of 1

It is certified that error appears in the above-identified patent and that said Letters Patent is hereby corrected as shown below:

On the Title Page

Item (71) Applicant: Todd Pittman, Ellicott City, MD (US)

Should read:
(71) Applicant: Todd Pittman, Ellicott City, MD (US)
                Daniel Jones, Baltimore, MD (US)
                Garrett Hickman, Halethorpe, MD (US)
                James Franson, Ellicott City, MD (US)

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*